Patented June 23, 1953

2,643,179

UNITED STATES PATENT OFFICE 2,643,179

METHOD OF TREATMENT OF FLUORINATED ALUMINUM-BEARING MINERAL PRODUCTS

Wayne E. White, Tulsa, Okla., assignor to Ozark-Mahoning Company, Tulsa, Okla., a corporation of Delaware No Drawing. Application July 21, 1950,
Serial No. 175,289

5 Claims. (Cl. 23—14)

1

This invention relates to the treatment of mineral products and particularly to the recovery and economic utilization of fluorine and aluminum values in aluminum-bearing minerals such as alumina or bauxite following their utilization in sorption of fluorine, a typical example being the mineral residue or waste resulting from treatment of alkylated petroleum products with bauxite or alumina to remove residual fluorine derived from use of hydrogen fluoride in the alkylation process.

The affinity of aluminum oxide for fluorine renders bauxite a useful agent for sorption of fluorine from products containing unwanted quantities of this element, but the fluorine-bearing material remaining after the treatment and containing usually about 20% fluorine though sometimes up to about 35% by weight has presented a difficult disposal problem particularly since a large percentage of the fluorine content may leach out and contaminate streams or even escape into the atmosphere when the material is dumped in piles or otherwise discarded as waste.

As far as I am aware no practice has been available for utilizing economically the fluorine and/or aluminum values of this material and quantities of it have accumulated adjacent certain petroleum products alkylating plants because of difficulties in otherwise disposing of it.

In accordance with the present invention, however, practical use is made of fluorine-bearing bauxite and other fluorine- and aluminum-bearing minerals and mineral products from whatever source derived in the manufacture of the material disclosed in my copending application for United States Letters Patent Serial No. 167,478, filed June 10, 1950, for Method of Fluoridation of Water Supplies and Material Therefor, the said material having its principal utility in treatment of municipal water supplies to impart thereto a fluorine content to increase resistance to dental caries and also to assist in clarifying the water if it contains suspended matter, all as more fully described in that application together with certain methods for making said material using calcium fluoride as the source of fluorine; the present invention is directed to a method for producing it from fluorine-bearing bauxite or the like.

It is therefore an object of this invention to provide a method for utilizing fluorine-bearing bauxite or generally similar materials in the manufacture of a water treating agent whereby a heretofore commercially useless product may be converted to a useful one.

2

A further object is the provision of a novel method of making a water treating agent containing fluorine, aluminum and the sulfate radical in such relation that when introduced into a water supply fluorine desirably not in excess of about 1 part per million is dissolved in the water and suspended matter is coagulated and precipitated in a manner similar to water clarification by the use of alum.

Another object is to provide a commercially useful method for recovering heretofore unrecoverable fluorine and aluminum values from fluorine-bearing bauxite or the like.

Other objects, purposes and advantages of the invention will more fully appear in or be understood from the following more detailed description of it with particular reference to its practice in the utilization of fluorine-bearing bauxite produced as a waste material or by-product in the removal of residual fluorine from petroleum products alkylated by use of hydrogen fluoride, such waste material or by-product, herein referred to as spent bauxite, being typical of fluorine- and aluminum-bearing materials useful in accordance with the invention for manufacture of the water-treating agent disclosed in my said copending application.

The said agent, a white pulverulent solid, contains aluminum, fluorine and the sulfate radical apparently in the relation $AlFSO_4 \cdot H_2O$ and, as hitherto mentioned, in said copending application methods for making it using calcium fluoride as a source of fluorine are disclosed. But in accordance with the present method calcium fluoride is not required for the production of the agent, the fluorine contained in the spent bauxite usually being present in sufficient concentration to supply the required quantity of this element.

More specifically the present method comprises digesting the spent bauxite with sulfuric acid desirably for a period of about two hours during which the mass is maintained at a temperature of about 80° C. or higher and preferably stirred constantly.

This treatment results in substantially complete dissolution of the bauxite in the liquid when the ingredients are combined in approximately the proportion by weight of 1 part spent bauxite : 2 parts $H_2SO_4$ : 30 parts $H_2O$, and little or no solid material remains. However should there be any it is preferably separated from the solution, either by sedimentation or filtration, and the latter then evaporated to dryness, yielding a more or less glassy whitish solid which when pulverized in a suitable mill is ready for use in water treatment similarly to the material disclosed in said copending application.

When bauxite, alumina or other mineral consisting principally of aluminum oxide ($Al_2O_3$) is utilized in sorption of fluorine, for example from alkylated petroleum products, a reaction between fluorine present as hydrogen fluoride (HF) or in relatively unstable organic fluorides and the aluminum oxide apparently occurs, probably in accordance with the following partial equation:

$$Al_2O_3 \cdot xH_2O + 6F^- \rightarrow 2AlF_3 + \ldots \quad (1)$$

In addition, as by sorption of the fluorine from the relatively unstable organic fluorides, substantial fluorine values may be retained by the spent bauxite although uncombined chemically with the aluminum oxide therein so that a fairly large proportion of the latter may remain chemically unchanged after the capacity of the bauxite for sorption of additional fluorine values has declined sufficiently to render its replacement with fresh activated bauxite desirable, this point usually being attained when the bauxite has taken up about 20% of its weight in fluorine.

The fluorine content of the spent bauxite present as the above aluminum fluoride ($AlF_3$) which is substatnially insoluble in water and relatively inert, upon digestion with sulfuric acid under the conditions stated apparently reacts with the acid as follows:

$$AlF_3 + H_2SO_4 + H_2O \rightarrow AlFSO_4 \cdot H_2O + 2HF \quad (2)$$

Hydrogen fluoride thus generated and fluorine released by desorption from the beauxite probably further react in accordance with Equation 1 with unreacted aluminum oxide present in the spent bauxite to produce more aluminum fluoride for further reaction with sulfuric acid according to Equation 2 until substantially all the fluorine values in the spent bauxite have been converted to the soluble end product $AlFSO_4 \cdot H_2O$.

If, as is preferable, sulfuric acid is supplied in an amount beyond that required to effect this conversion the acid may react alone with residual aluminum oxide in the beauxite to produce aluminum sulfate ($Al_2(SO_4)_3$) in accordance with the following equation:

$$Al_2O_3 + 3H_2SO_4 \rightarrow Al_2(SO_4)_3 + 3H_2O \quad (3)$$

This product, commercial known as alum, while having no noticeable effect on water treated with it insofar as reduction of dental caries is concerned, does aid in coagulating suspended matter and its presence in the water-treating agent is therefore not inimical and in fact usually of advantage.

However, if it is desired to reduce the alum formation, hydrogen fluoride (HF) may be added to the digestion mass, and by its reaction with the alum produced in accordance with Equation 3 or directly with aluminum oxide and sulfuric acid additional $AlFSO_4$ is formed substantially in accordance with Equations 1 and 2.

Normally but an insignificant insoluble residue remains after the digestion has proceeded so completion so on evaporation of the solution to dryness, under reduced pressure if desired, the solid water-treating material readily may be recovered without resorting to an intermediate filtration or sedimentation separation. The solid remaining after the evaporation is relatively friable and its pulverization is easily effected with the aid of any suitable apparatus.

Treatment of water supplies with this material, as described in my said copending application, requires merely that a quantity of it be introduced to the water, preferably continuously during passage of the latter through the treating plant to a settling basin, filter bed or the like. The material, which is readily soluble, immediately dissolves and disperses in the flowing water and the latter retains fluorine values of the material while the aluminum values coagulate suspended matter in the water, as well as retain excess fluorine values, and are removed from the water by settling or by the filter bed, this water clarifying phase of the treatment being substantially similar to that effected by introduction of alum to water supplies in accordance with methods now widely used.

While I have herein described with considerable particularity the several steps of my method of producing a useful water-treating agent from a substance heretofore regarded as a useless waste, and have stated in detail certain conditions preferably observed in the practice of the said method, it will be understood I do not desire or intend thereby to restrict or confine myself thereto or thereby as changes in the procedure, in the specific ingredients and relative proportions thereof as well as in other respects will readily occur to those skilled in the art and may be employed if desired without departing from the spirit and scope of the invention as defined in the appended claims.

Having thus described my invention, I claim and desire to protect by Letters Patent of the United States:

1. The method of producing a water-treating agent from an aluminum- and fluorine-bearing product resulting from the action of a fluoride upon beauxite which comprises digesting a mass thereof with dilute sulfuric acid until the mass is substantially dissolved, then evaporating the solution substantially to dryness and pulverizing the fluorine-value-containing solid residue.

2. The method of treating an aluminum- and fluorine-bearing product resulting from the action of a fluoride upon bauxite for production of a water-treating agent therefrom which comprises digesting a mass thereof with dilute sulfuric acid at a temperature not less than about 80° C., separating the solute from remaining solids, evaporating water from the solute to produce a fluorine-value-containing solid residue and finally pulverizing the latter.

3. The method of recovering aluminum and fluorine values from bauxite after subjection to the action of a fluoride which comprises digesting a mass thereof with dilute sulfuric acid in the proportions by weight of about one part of the bauxite to about two parts of the acid in the presence of about thirty parts of water, separating undissolved solids from the liquid remaining after the digestion, then extracting water from said liquid and comminuting the fluorine-value-containing solid residue.

4. The method of producing a water-treating agent which comprises digesting a mass of the product resulting from the action of a fluoride upon bauxite in dilute sulfuric acid in the proportion by weight of about two parts of the acid to one part of said product for about two hours at a temperature of about 80° C., then removing and evaporating to dryness the resulting liquid and finally reducing the fluorine-value-containing residual solid to pulverulent form.

5. The method of producing a water-treating agent predominantly from waste fluorine-containing bauxite resulting from sorption of fluorine by the bauxite during purification of alkylated petroleum products which consists in digesting about one part by weight of the waste bauxite in about two parts by weight of sulfuric acid and about thirty parts of water for approximately two hours at a temperature of about 80° C., then decanting and evaporating the resulting liquid to dryness and pulverizing the fluorine-value-containing residual solid.

WAYNE E. WHITE.

References Cited in the file of this patent

UNITED STATES PATENTS

| Number | Name | Date |
|---|---|---|
| 1,480,928 | Bishop | Jan. 15, 1924 |
| 1,661,618 | Muth | Mar. 6, 1928 |
| 2,273,930 | Brown | Feb. 24, 1942 |